United States Patent Office 2,903,373
Patented Sept. 8, 1959

2,903,373

FUSED CAST ZIRCONIA-ALUMINA ARTICLES

Karl H. Sandmeyer, Niagara Falls, N.Y., assignor to The Carborundum Company, Niagara Falls, N.Y., a corporation of Delaware No Drawing. Application November 30, 1956
Serial No. 625,239

3 Claims. (Cl. 106—57)

This invention relates to fused cast shapes made by fusing a mass of refractory material of the desired composition to the molten condition, casting the fused material while molten into suitable molds, and cooling the cast material under controlled conditions to form a monolithic article of the desired size and shape. The invention is particularly concerned with predominantly zirconia-alumina refractory compositions of improved physical characteristics in cast form.

It has been common experience in making fusions of various proportions of zircon (zirconium silicate) and alumina and casting shapes therefrom to find incipient cracking prevalent in the resulting fused cast articles. It is highly desirable to eliminate, or at least minimize, the development of cracks in such compositions in order to obtain cast articles having optimum physical strength, and resistance to corrosion and erosion in subsequent use.

I have discovered that fused cast articles made from fusions of zircon and alumina can be greatly improved in physical characteristics by the modification thereof with small percentages of added constituents within narrow critical percentages. I have found that compositions containing, in addition to the zircon and alumina, small percentages of an alkali oxide, such as sodium oxide or potassium oxide, together with fractional percentages of boric oxide, in combination, when fused to the molten condition, cast into molds and suitably cooled, provide improved cast articles which are highly satisfactory for use as glass tank lining elements and other refractory applications. The resulting articles are also useful in applications where abrasion resistance is required as in ball mill lining elements, chute liners and the like.

I have found that when the various constituents are selected in the amounts prescribed below, the resulting articles consist essentially of crystalline zirconia and crystalline alumina embedded and dispersed throughout a siliceous glassy matrix derived from the silica and any impurities in the original zircon in combination with the alkali oxide and boric oxide of the raw mix. The resulting articles are dense and finely crystalline, are without excessive shrinkage cavities or vugs or otherwise excessively porous and, when cooled, are sound and substantially free from cracks or lines of weakness. A typical mixture for forming cast articles in accordance with the present invention consists of approxiately equal parts by wcight of a high-purity crystalline alumina, such as white alumina ore, and high grade zircon, together with 1% to 2½% soda ash and 0.10% to 0.5% of boric oxide. The zircon material is of high quality containing about 99% or more of zirconium silicate analyzing approximately 67% zirconia and 33% silica. One satisfactory source of alumina for carrying out the present invention is that sold by the Aluminum Company of America as A-1 grade white alumina ore of which the following is a typical chemical analysis:

| | Percent |
|---|---|
| $Al_2O_3$ | 98.89 |
| $SiO_2$ | .03 |
| $Na_2O$ | .55 |
| $Fe_2O_3$ | .03 |
| $TiO_2$ | .004 |
| Ignition loss | .50 |

The composition of the fused cast shapes made from such a mixture in accordance with the present invention contain, by oxide analysis, in addition to the crystalline alumina and crystalline zirconia, which together amount to 80% or more by weight of the article and are approximately in the ratio of 5:4, a siliceous glassy matrix material constituting the remaining 20% or less of the block. The glassy matrix is derived from the silica and any impurities of the original zircon, the alkali oxide of the soda ash, and the boric oxide. When raw materials of relatively high purity, such as those prescribed in Example I below, are used, the glassy matrix is of a light cream color so that when the resulting cast article is exposed to very high temperatures where some oozing of the glassy matrix tends to occur, any coloring action of the matrix on materials in contact with the cast shape is not perceptible. It has been found that, small as the actual percentages of the minor ingredients are, both the alkali oxide and the boric oxide are essential to obtaining satisfactory results. The siliceous glassy matrix is predominantly silica, the silica amounting to 10 to 20% by weight of the cast shape.

The following is an example of a composition or raw batch that has been found satisfactory for the making of fused cast articles of the type herein described:

*Example 1*

| | Parts by weight |
|---|---|
| White alumina ore | 50 |
| Zircon | 50 |
| Soda ash ($Na_2CO_3$) | 2 |
| Anhydrous boric oxide | 0.15 |

Fused cast articles made from the above raw batch upon chemical analysis were found to have the following composition:

| | |
|---|---|
| $Al_2O_3$ | 45.15 |
| $ZrO_2$ | 36.72 |
| $SiO_2$ | 16.26 |
| $Fe_2O_3$ | 0.15 |
| $TiO_2$ | 0.06 |
| CaO | Nil |
| MgO | Trace |
| Alkali oxides | 1.39 |
| $B_2O_3$ | 0.23 |
| Free carbon | 0.04 |

As is evident from the above table of percentages, the ratio of alumina to zirconia in the product is approximately 5:4.

In the production of refractories of the herein described type the alumina ore or other source of high purity alumina and the zircon or the equivalent in zirconia and silica are fused in a furnace such as a submerged arc furnace (as, for instance, that disclosed in U.S. Patent No. 929,517 to F. J. Tone) similar to that used in the production of synthetic alumina abrasives. The alkali oxide, such as sodium or potassium oxide, usually in the form of soda ash, and the boric oxide, are either admixed with the zircon and alumina or admixed in much larger proportions with a special charge of zircon and alumina that is added to the furnace after fusion of the main bulk of the material has been completed.

In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell, but after a bath of molten material is formed the resistance of this molten material to the passage of electric current therethrough is used to supply heat. The material is gradually fed in, and the electrodes raised as the fused mass is built up. The procedure followed is substantially similar to that employed in making ordinary aluminous abrasives. When the material has arrived at the proper temperature and the correct degree of fluidity, it is poured into molds of the desired shape and size.

The molded pieces are left in the mold for heat treatment or, particularly in the case of iron molds, are taken from the molds shortly after the outer walls of the casting have solidified. Thereafter, they are carefully cooled by any of the methods well known in the art, and after they are cold, any objectionable remainder of the header or other minor roughness is removed by chipping or grinding.

Having described the invention in detail, it is desired to claim:

1. A fused cast article consisting essentially of crystalline alumina and zirconia in approximately 5:4 ratio by weight in a siliceous glassy matrix, said article containing, by oxide analysis, 1% to 2½% by weight of an alkali oxide, 0.10% to 0.5% by weight of boric oxide and about 15% by weight of silica.

2. A fused cast article containing, by oxide analysis, about 47% by weight of alumina, about 36% by weight of zirconia, about 15% by weight of silica, about 1½% by weight of alkali oxides, and about ½% by weight of boric oxide.

3. A fused cast article containing, by oxide analysis, 1% to 2½% by weight of an alkali oxide, 0.10% to 0.5% by weight of boric oxide, and 10% to 20% by weight of silica, the remainder of said article being substantially entirely crystalline alumina and zirconia in 5:4 ratio by weight.

References Cited in the file of this patent

UNITED STATES PATENTS

| 2,154,318 | Benner et al. | Apr. 11, 1939 |
| 2,675,323 | Busby et al. | Apr. 13, 1954 |
| 2,695,849 | McMullen | Nov. 30, 1954 |

FOREIGN PATENTS

| 623,174 | Great Britain | May 13, 1949 |
| 676,586 | Great Britain | July 30, 1952 |